Nov. 24, 1953

R. URTEL 2,660,672

METHOD AND MEANS FOR GENERATING IMPULSES OF LARGE KEYING RATIO

Filed Feb. 15, 1952

2 Sheets-Sheet 1

INVENTOR
R. URTEL
BY R.P. Morris
ATTORNEY

Nov. 24, 1953 R. URTEL 2,660,672

METHOD AND MEANS FOR GENERATING IMPULSES OF LARGE KEYING RATIO

Filed Feb. 15, 1952 2 Sheets-Sheet 2

INVENTOR
R. URTEL
BY R P Morris
ATTORNEY

Patented Nov. 24, 1953

2,660,672

UNITED STATES PATENT OFFICE 2,660,672

METHOD AND MEANS FOR GENERATING IMPULSES OF LARGE KEYING RATIO

Rudolf Urtel, Pforzheim, Germany, assignor to International Standard Electric Corporation, New York, N. Y., a corporation of Delaware Application February 15, 1952, Serial No. 271,665

2 Claims. (Cl. 250—27)

Figure 1:
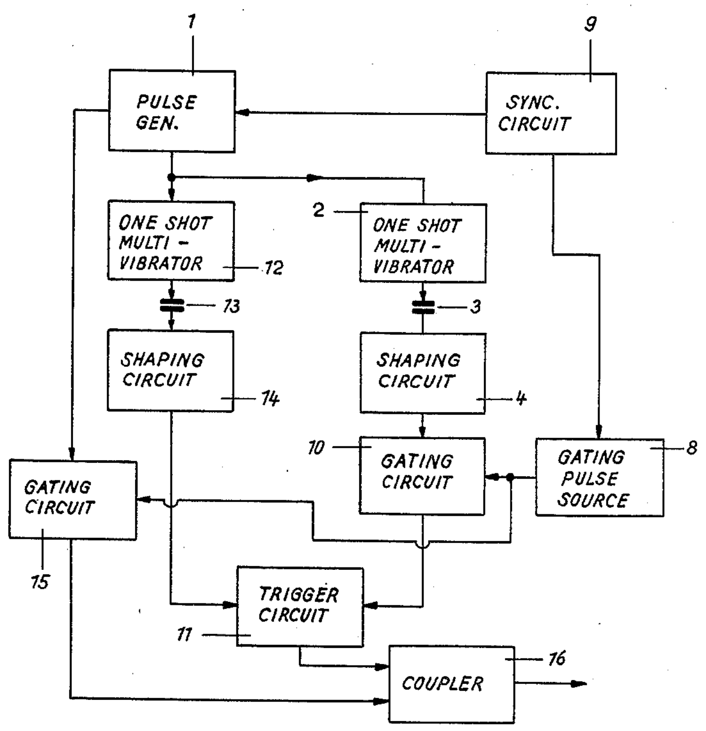

In telecommunication engineering it is often required to generate impulses of high repetition frequency for synchronization purposes in which the impulse period with respect to the impulse spacing is large, that is, the spacing intervening between two impulses. This large keying ratio of pulses may be used for example in synchronization of television receivers or teleprinters. When low repetition frequencies in the order of magnitude of 1–10 cycles per second are used, this effect may be readily accomplished by means of relays or mechanical sweeps. At repetition frequencies in the order of magnitude of 30,000 cycles per second as is used in television, however, other arrangements have to be used. The so-called one-shot multivibrator which may be started by short duration impulses from impulse generator would appear to be a suitable solution. However, such one-shot multivibrators are unreliable for the keying ratios greater than 1–1, that is, if the impulse period or duration is less than or equal to the impulse interval. When the impulse interval is very small in ratio to the impulse period, as for example keying ratio of 5–1, then one-shot multivibrators are not suitable because the one-shot multivibrators at these large keying ratios tends to drop out some of the impulses, that is, tends to carry over to the next keying pulse.

According to this invention there is provided a method and system for generating impulses of large keying ratio and of high impulse repetition frequency in which a first train of short impulses having a relatively long impulse interval is generated. These generated impulses are passed through a delay device so that a second train is produced having a delay less than the pulse interval on the pulse interval of the first train but close to the length of this interval. Both these trains of impulses are then applied to a doubly stable trigger circuit so that impulses from the first train operate the trigger circuit into the one condition and the impulses of the delay train operated in the other stable condition, so that impulses equal in length to the time spacing between the pulses of the two trains, but of the same repetition frequency of the original train, are produced.

The invention is described in connection with a particular circuit arrangement for the generation of frame scanning impulses for the standard television synchronizing system. In television, it is well known that the frame synchronizing impulses differ from the line synchronizing impulses principally by their greater length or time duration. In order to avoid loss of line synchronizing pulses during the occurrence of these long frame scanning impulses it is customary to cut out or produce effective spacing in the long pulses at periods equal to the horizontal scanning pulse periods. In a presently standardized form of television system the frame synchronizing impulses are divided into six pulses with very small pulse intervals. The keying ratio is about 5–1 for these six pulses and the impulse repetition frequency 31,250 cycles per second.

Figure 2:
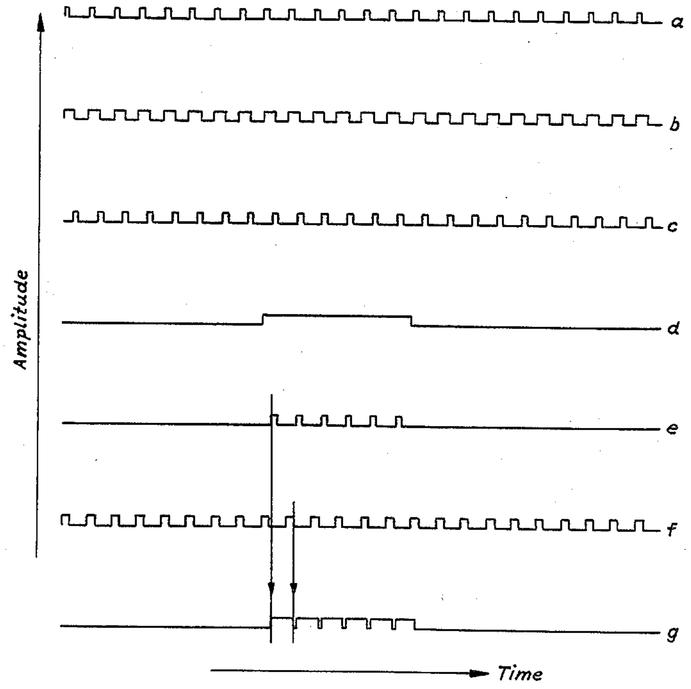

An example of this invention is illustrated in the accompanying drawings as applied to a system for producing scanning pulse trains for television receivers, in which Figure 1 is a block schematic diagram illustrating the circuit and Fig. 2 is a set of curves in amplitude versus time used in explaining the operation of the system of Fig. 1.

Turning to the drawing there is shown an impulse generator 1 which generates pulses suitable for line synchronization purposes, these pulses being of short duration with respect to the impulse interval as illustrated at curve *a*, Fig. 2. The pulse train from pulse generator 1 is fed to a one-shot multi-vibrator 2 to produce a train of pulses as indicated in curve *b* of Fig. 2. It is well known that such one-shot multi-vibrators are arranged to be at rest at a single condition of stability. The impulses from the pulse generator 1 trigger the multi-vibrator into its other condition where it dwells for the period dependent upon the time constant of the circuit and then automatically returns to its normal stable condition. The output pulses from multi-vibrator 2 are then differentiated as for example in condenser 3 and the pulses resulting from the trailing edge of the applied pulses may be shaped in a shaping circuit 4 to produce the delayed pulse train shown at curve *c*, Fig. 2. Thus the multi-vibrator 2, condenser 3 and shaping circuit 4 constitute a delay device which serves to produce the delayed train of pulses, curve *c*. For the purpose of television operation this delay is chosen to be such that the impulses of curve *c* are spaced in time from the succeeding pulses of curve *a* at a distance corresponding to the desired pulse interval. The gating pulse source 8 is provided preferably synchronized with the operation of pulse generator 1 by means of a synchronizing circuit 9 to produce gating pulses at intervals corresponding to the frame synchronizing periods. These gating pulses are in the present case made of sufficient length to embrace six of the pulses of curves *a* or *c*, Fig. 2, as illustrated in curve *d*. The pulses from shaping circuit 4 and from gating source 8 are applied to gate circuit 10 so as to release six of the delayed pulses to trigger circuit 11 each time one of the gating pulses is applied to the circuit 10. Trigger circuit 11 is preferably the type of circuit known as the "Eccles-Jordan" circuit which has two states of stability and may be triggered into one state of stability by one set of pulses and triggered back into the other state of stability by other applied pulses. Pulses from the pulse generator 1 are also applied to trigger circuit 11 so as to produce in this trigger circuit a group of pulses of a duration determined by the relative time delay of the pulses through gating circuit 10 with respect to the pulses from source 1. This output pulse may be then used as a frame synchronizing pulse for television systems. In order that the frame synchronizing pulse be spaced somewhat from the next successive line synchronizing pulse it is preferable also to delay slightly the pulses from source 1 before application of them to trigger circuit 11. This delay may be effected by means of a second one-shot multi-vibrator 12 differentiating condenser 13 and shaping circuit 14. It will be evident that a group of six pulses from the train shown in curve c is shown in trigger circuit 11 as shown in curve e, Fig. 2. The output pulses from multi-vibrator 12 are shown at curve f and it is noted that their trailing edges are so spaced by virtue of differentiation that the produced pulses will be spaced from the pulses of curve a by an amount just greater than the time duration or width of the pulses in curve a. These pulses then when applied to trigger circuit 11 produce a composite frame synchronized pulse illustrated in curve G, Fig. 2. It will be noted that this composite pulse consists of a train of six pulses of large keying ratio. The system illustrated herein provides frame synchronizing pulses of a precise length since the beginnings and ends of the pulses are precisely determined by the pulses from generator 1, with or without the fixed delay. Accordingly, the pulse source 8 is not critical as to pulse length, it being only necessary to maintain the pulses from this source at a length sufficient to gate through six pulses from the applied train.

In order to apply the pulses together as a common synchronizing train a second gating circuit 15 may be provided connected with pulse generator 1. Unlike gating circuit 10, which is normally closed, gating circuit 15 is normally open and the pulses from gating source 8 are applied thereto to close the gate during the same time interval that gating circuit 10 is opened. Thus a gap is produced in the pulse train such as train a adjusted sufficiently wide for the insertion of the composite pulse curve g, Fig. 2. These two pulse trains may then be combined in a coupler 16 to produce the desired composite synchronization pulse train for the television synchronization.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A system for generating impulses of a large keying ratio and a predetermined repetition frequency comprising a pulse generator for generating a train of short pulses of said repetition frequency and having a long impulse interval spacing, a delay device, means for applying the train of pulses to said delay device to produce a second train of pulses delayed by a train less than said long impulse interval, a doubly stable trigger circuit, a coupler for applying pulses from said first train to said trigger circuit to operate it into one condition of stability, a coupler for applying the delayed pulses of said second train to said trigger circuit to operate it into its other condition of stability, a gating pulse generator for generating gating pulses having a duration of a plurality of periods of said repetition frequency and related in time spacing to said first named pulse generator, a gating circuit in one of said couplers and means to apply said gating pulses to said gating circuits to release the pulses occurring for the duration of said gating pulses to said trigger circuit, to produce a composite pulse of a length determined by said gating pulse.

2. A system according to claim 1, wherein said first-named generator is a television line synchronizing pulse generator and said composite pulses is a frame synchronizing pulse, further comprising a second delay device for producing a delay of impulses of said first train at least equal to the length of said short pulses, interposed in the coupler to said trigger circuit, whereby said composite pulse is of a length determined by the triggering pulses.

RUDOLF URTEL.

References Cited in the file of this patent

UNITED STATES PATENTS

| Number | Name | Date |
|---|---|---|
| 2,086,918 | Luck | July 13, 1937 |
| 2,113,214 | Luck | Apr. 5, 1938 |
| 2,498,659 | De Rosa | Feb. 28, 1950 |
| 2,534,337 | Canfora et al. | Dec. 19, 1950 |
| 2,556,933 | Mulligan, Jr., et al. | June 12, 1951 |